United States Patent [19]

Utsumi et al.

[11] Patent Number: 4,677,188

[45] Date of Patent: Jun. 30, 1987

[54] TRANSPARENT SLIPPERY BIAXIALLY STRETCHED POLYESTER FILM

[75] Inventors: Shigeo Utsumi; Kichinojyo Tomitaka, both of Yokohama; Yujiro Fukuda, Tokyo, all of Japan

[73] Assignee: DiaFoil Company, Limited, Tokyo, Japan

[21] Appl. No.: 870,748

[22] Filed: Jun. 4, 1986

[30] Foreign Application Priority Data

Jun. 21, 1985 [JP] Japan .................................. 60-135764

[51] Int. Cl.$^4$ ............................................. C08G 63/02
[52] U.S. Cl. .................................... 528/272; 428/480; 264/176.1; 524/601; 525/437
[58] Field of Search ................. 528/272; 264/176; 524/601; 525/437

[56] References Cited

U.S. PATENT DOCUMENTS

| | | | |
|---|---|---|---|
| 4,454,312 | 6/1984 | Kuze et al. ............................ | 528/275 |
| 4,539,389 | 9/1985 | Kiriyama et al. .................... | 528/272 |
| 4,595,715 | 6/1986 | Kuze et al. ............................ | 523/181 |

*Primary Examiner*—Lucille M. Phynes
*Attorney, Agent, or Firm*—Oblon, Fisher, Spivak, McClelland & Maier

[57] ABSTRACT

There is disclosed a transparent slippery biaxially stretched polyester film characterized by satisfying the relations represented by the following formulas after being biaxially stretched and heat-set:

$$0.155 \leq \Delta P \leq 0.165 \tag{1}$$

$$1.605 \leq \bar{n} \leq 1.610 \tag{2}$$

$$\Delta n \leq 0.02 \tag{3}$$

$$7.0 \leq X_I \leq 11.0 \tag{4}$$

$$0.55 \leq [\eta]_F \leq 0.65 \tag{5}$$

$$0.007 \sqrt{[\eta]_F - 0.55} + 0.003 \geq \bar{n} - 1.604 \geq 0.007 \sqrt{[\eta]_F - 0.55} \tag{6}$$

$$\Delta H \leq 0.5 \tag{7}$$

wherein $\Delta P$, $\bar{n}$, $\Delta n$, $X_I$, $[\eta]_F$ and $\Delta H$ ar respectively degree of planar orientation, average refractive index, birefringence, % ratio of the peak value of the ($1\bar{1}0$) face measured by X-ray diffractometry to the peak value of the (100) face, intrinsic viscosity and surface haze of the biaxially stretched film.

3 Claims, No Drawings

TRANSPARENT SLIPPERY BIAXIALLY STRETCHED POLYESTER FILM

FIELD OF THE INVENTION

This invention relates to biaxially stretched polyester film, especially biaxially stretched polyester film having excellent physical properties, especially excellent slipperiness and optical properties which is suitable for use in photography and photoengraving. More particularly, this invention relates to polyester film having excellent slipperiness, transparency and scratch resistance to be used in photoengraving, X-ray photography, microfilm, electronic photography, diazo photography, etc., wherein excellent slipperiness and transparency as well as scratch resistance are required.

BACKGROUND OF THE INVENTION

Polyester films are satisfactory in almost all the properties required as the base film for photography and photoengraving such as transparency and hazelessness; tensile strength; resistance to splitting, torsion, curling, etc.; dimensional stability; resistance to photographic emulsion, water, alkali, etc.; resistance to thermal deformation; and freeness from foreign materials on the surface and interior. However, there has arisen in recent years, a demand for base films for photography and photoengraving of higher quality, that is, films having excellent transparency and excellent slipperiness, which are contradictory properties, have come to be demanded.

In order to improve slipperiness of polyester films, it has been attempted to form unevenness on the surface of the film by deposition of minute inert particles of catalyst residue or by the addition of minute inert particles of inorganic compounds. As long as the conventional film-making conditions are followed, however, there has been a problem that as the roughness of the surface is increased by formation of unevenness in the surface, the haziness of the surface is increased, and voids between the particles and the polymer are increased and thus the internal haziness is also increased and the overall transparency is abated.

We previously found that an improved film having good transparency and slipperiness was obtained by specifying the degree of planar orientation in the film surface ($\Delta P$) and the average refractive index ($\bar{n}$) of the film and forming unevenness units each comprising a protrusion (particle) and a recess with a longer diameter of 3 $\mu$m around the protrusion (Japanese Patent Application No. 59-227785).

In order to obtain such a film, it was necessary to longitudinally stretch the film so that the birefringence ($\Delta n$) after longitudinal stretching is very low. For that purpose, hard chromium-finished mirror rolls were used in order to eliminate scratching and stains due to sticking. This required an extremely low longitudinal stretching ratio and tended to contain productivity. If the film was stretched at higher temperature in order to enhance the ratio of longitudinal stretching, it was revealed stains due to sticking and scratches increased. In order to attain low $\Delta n$ after longitudinal stretching, it was necessary to longitudinally stretch in two or more steps so as to attain uniformity in thickness of the film, especially flatness of the film after biaxial stretching and heat-setting. Usually, thicker films having good transparency and slipperiness are manufactured by single step longitudinal stretching. If two-step stretching is required, the installment of new equipment is required, which invites increase in manufacturing cost. Control of the film-making in the two-step stretching is more difficult than in the case of one-step stretching. In the case of the manufacture of the film of this invention, in which defects like scratch must be extremely avoided, it was revealed that stretching in two or more steps is not suitable.

Thus to obtain transparent slippery film having excellent flatness, there was a need to develop a new process which provides such films with one step stretching using hard-chromium finished mirror rolls.

In consideration of the above-described problems, we found on the basis of intensive studies that a film having uniform thickness, good flatness, transparency and slipperiness can be obtained by one step stretching only if the film satisfies the following formulas (1) to (7) after being biaxially stretched and heat-set.

DISCLOSURE OF THE INVENTION

This invention comprises a biaxially stretched polyester film excellent in transparency and slipperiness, which satisfies the following formulas:

$$0.155 \leq \Delta P \leq 0.165 \tag{1}$$

$$1.605 \leq \bar{n} \leq 1.610 \tag{2}$$

$$\Delta n \leq 0.02 \tag{3}$$

$$7.0 \leq X_I \leq 11.0 \tag{4}$$

$$0.55 \leq [\eta]_F \leq 0.65 \tag{5}$$

$$0.007 \sqrt{[\eta]_F - 0.55} + 0.003 \geq \bar{n} - 1.604 \geq 0.007 \sqrt{[\eta]_F - 0.55} \tag{6}$$

$$\Delta H \leq 0.5 \tag{7}$$

wherein $\Delta P$, $\bar{n}$, $\Delta n$, $X_I$, $[\eta]_F$ and $\Delta H$ are respectively degree of planar orientation, average refractive index, birefringence, % ratio of the peak value of the (1$\bar{1}$0) face measured by X-ray diffractometry to the peak value of the (100) face, intrinsic viscosity and surface haze.

The invention will now be explained in detail.

The term "polyester" used herein includes polymers obtainable by polycondensation of an aromatic dicarboxylic acid such as terephthalic acid, isophthalic acid, naphthalene-2,6-dicarboxylic acid or an ester thereof and a glycol such as ethylene glycol, diethylene glycol, tetramethylene glycol, etc.

These polyesters can be obtained not only by direct polycondensation of an aromatic dicarboxylic acid and a glycol but also by ester interchange of an aromatic dicarboxylic acid dialkyl ester and a glycol followed by polycondensation, or by polycondensation of an aromatic dicarboxylic acid diglycol ester. Typical examples of such polymers are poly(ethylene terephthalate), poly(ethylene 2,6-naphthalenedicarboxylate), etc. This polymer may be a homopolymer or a copolyester in which a non-aromatic dicarboxylic acid component occupies not more than 15 mole% of the dicarboxylic acid component, and/or a diol component other than aliphatic glycol occupies not more than 15 mole% of the diol component.

Further, the above-mentioned polyester may be a blend with other polymers. Examples of blendable polymers are polyamide, polyolefin and other polyester (including polycarbonate).

It is preferable to add some organic lubricant in order to improve slipperiness. Although the organic lubricants are not specifically limited, fatty acid, fatty acid ester and alkylene-bis-aliphatic or aromatic amide are preferred. As a fatty acid, an acid having a large number of carbon atoms such as montanic acid is preferred. As fatty acid ester, montanic acid-EG ester is an example. As alkylene bis-aliphatic or aromatic amide, hexamethylene-bis-behenamide, hexamethylene-bis-stearylamide, N,N'-distearylterephthalamide, etc. can be referred to. These organic lubricants can be incorporated in the film in an amount of 0 ppm to 500 ppm, preferably, 0 ppm to 200 ppm. These lubricants should not be incorporated in a large amount. A large amount of such lubricant may deposit on the surface of the film, impair adhesion in coating, or cause yellowing of the film.

Further, it is preferred to incorporate a polyalkylene glycol for the purpose of improving printing properties and adhesion between film and deposited metal in the vacuum deposition process. Examples of the polyalkylene glycol are polyethylene glycol, polytetramethylene glycol, polypropylene glycol, etc. These polyalkylene glycols can be incorporated in the polyester during ester interchange and polymerization. Or these can be incorporated by blending a copolymer in which an alkylene glycol is copolymerized in the polyester, or these can be blended by kneading during drying or extrusion, or by any other means. The molecular weight of these polyalkylenes should be not more than 10,000, preferably not more than 8,000, so that they do not impair the transparency of the film. The content in the film is preferably not more than 1%, more preferably not more than 0.5%.

The above-described polyester may contain additives such as a stabilizer, pigment, antioxidant, defoamer, etc. Also minute and/or inert inorganic particles can be contained in order to provide the polyester film with slipperiness.

The minute particles may be externally added particles of kaolin, clay, salts or oxides of elements selected from Groups II, III, IV etc. of the periodic table such as calcium carbonate, silicon oxide, calcium terephthalate, aluminum oxide, titanium oxide, calcium phosphate, etc. Or they may be high-melting organic compounds insoluble in the course of the process of melting polyester resins, cross-linked polymers, and particles formed from the insoluble residue of the catalyst used for preparation of the polymer such as alkali metal compounds, alkaline earth metal compounds, etc.

The amount of the minute particles contained in the film is 0.005 to 0.9% by weight and the average particle diameter is in the range of 0.01 to 3.5 μm.

The film may contain both externally added particles and the internally formed particles. The particles suitable for the purpose of this invention should preferably have a refractive index close to that of polyethylene terephthalate and should not tend to form voids around themselves when the film is stretched. The particles which especially satisfy such conditions are amorphous silica particles. Amorphous silica can be used alone or in combination with other particles. Most preferable is a bimodal system of larger particles and smaller particles, both being of amorphous silica. At any rate, it is preferred that the amorphous silica having an average particle diameter of 0.8μ to 1.5μ, be contained in an amount of 0.003 to 0.015% by weight. Particles, of which the average particle diameter is less than 0.8μ, contribute little to slipperiness, while particles, the average particle diameter of which is more than 1.5μ, cause streaking on the surface of the film. If the content is less than 0.003% by weight, slipperiness is poor, while with a content more than 0.015% by weight, transparency is deteriorated.

In the present invention, degree of planar orientation ($\Delta P$), average refractive index ($\bar{n}$), birefringence ($\Delta n$), % ratio ($X_I$) of the peak value of the ($1\bar{1}0$) face measured by X-ray diffractometry to the peak value of the (100) face ($X_I = X_{1\bar{1}0}/X_{100} \times 100\%$), intrinsic viscosity ($[\eta]_F$) and surface haze ($\Delta H$) of the film are respectively specified, whereby films provided with excellency in flatness, transparency and slipperiness and are free from scratching, can be obtained by one step stretching with hard-chromium finished mirror rolls.

The average refractive index $\bar{n}$ used herein means $$\bar{n} = \tfrac{1}{3}(n_\alpha + n_\beta + n_\gamma)$$

wherein $n_\alpha$ is the refractive index in the direction of thickness, $n_\gamma$ is the refractive index in the direction of the main orientation and $n_\beta$ is the refractive index in the direction perpendicular to the direction of the main orientation.

The average refractive index $\bar{n}$ is a value which is approximately proportional to a value $(d-d_a)/(d_c-d_a)$, wherein $d_c$ is the density of the crystalline portion, $d_a$ is the density of the amorphous portion and $d$ is the density of the film, and depends upon the temperature of the heat-setting. As the heat-setting temperature is raised, the $\bar{n}$ value increases.

The degree of the surface orientation $\Delta P$ is defined as $$\Delta P = (n_\beta + n_\gamma)/2 - n_\alpha \qquad (I)$$

As understood from the above definition, $\Delta P$ is an index of how the film surface is oriented and generally represents the parallelism of the benzene rings to the film surface. Therefore, this value increases as the film is stretched longitudinally and/or transversely at lower temperatures, at higher stretching ratios, and as the film is heat-set at higher temperatures.

$\Delta n$ is birefringence in the film surface, and is defined with $n_\gamma$ and $n_\beta$ as $$\Delta n = n_\gamma - n_\beta \qquad (II)$$

$\Delta n$ is a value representing the degree of anisotropy of the refractive indices of the film surface. Although the $\gamma$ direction is different in central portions and peripheral portions of the film, which is the so-called bowing phenomenon, the higher the anisotropy, the greater the $\Delta n$ value.

The average refractive index is preferably not less than 1.600 and not more than 1.610. If the average refractive index is lower than 1.600, dimensional change occurs when a solvent, adhesive, etc. are applied to the film. On the other hand, if the average refractive index is in excess of 1.610, the mechanical properties of the film deteriorates.

It is required that the degree of surface orientation $\Delta P$ and $X_I$ satisfy the relation $0.155 \leq \Delta P \leq 0.165 \ldots (1)$ and $7.0 \leq X_I \leq 11.0 \ldots (4)$ respectively. The most important point of this invention resides in this respect. It is possible to decrease ΔP and increase $X_I$ by decreasing birefringence (Δn) after longitudinal stretching as described in Japanese Patent Application No. 59-227785. But this method has various drawbacks as mentioned above. In the present invention, ΔP must be 0.155 to 0.165 and $X_I$ must be 7.0 to 11.0% without lowering the birefringence Δn after longitudinal stretching, that is, using a longitudinally stretched film having a birefringence over 0.080. In order to attain this, it is necessary to decrease the refractive index in the transverse direction as learned from the relation (I). But if simply the factor of transverse stretching is decreased in order to decrease the refractive index in the transverse direction, as is well known the uniformity of the thickness is extremely deteriorated. In order to solve this problem, we found after an intensive study that ΔP can be decreased without deteriorating the uniformity in the thickness by transversally stretching the film by an ordinary factor and then transversally relaxing when the film is heat-set. The thus obtained film is small in the transverse refractive index, and as a result the birefringence in the film Δn is small. Therefore, the film of this invention must essentially satisfy the formula $$\Delta n \leq 0.02 \quad (3)$$

Here preferably $\Delta n \leq 0.015$, and more preferably $\Delta n \leq 0.01$. Such a film is low in anisotropy of the film and excellent in flatness.

However, it was found that even when the formulas (1) to (4) are satisfied, some films are inferior in slipperiness. Our investigation revealed that when the intrinsic viscosity of the film $[\eta]_F$ exceeds 0.65, slippery films cannot be obtained. On the other hand, when the intrinsic viscosity $[\eta]_F$ of the film is so low as less than 0.55, haze of the film becomes marked if the relations (1) to (4) are satisfied. Further, it was revealed that when the $[\eta]_F$ value is high, slipperiness increases as the film is heat-set at higher temperatures, while when the $[\eta]_F$ value is low, transparency is deteriorated if the film is heat-set at higher temperatures. We sought after the correlation between $[\eta]_F$ and $\bar{n}$ which relates to the heat setting temperature, it was revealed that the following formula must be satisfied:

$$0.007 \sqrt{[\eta]_F - 0.55} + 0.003 \geq \bar{n} - 1.604 \geq 0.007 \sqrt{[\eta]_F - 0.55} \quad (6)$$

In this way, transparent, slippery film having excellent flatness and surface properties can be obtained. But the surface haze ΔH must be not more than 0.5. When the ΔH value is in excess of 0.5, the film is transparent when viewed perpendicularly. But even if the total haze is low, transparency is impaired when viewed at an angle because of increased random reflexion. Preferably $\Delta H \leq 0.4$, and more preferably, $\Delta H \leq 0.3$.

It was surprisingly found that of films made of a material of the same composition, the film, of which ΔP, $\bar{n}$, Δn, $X_I$, $[\eta]_F$ and ΔH satisfy the above-described ranges, is excellent in flatness, surface properties, transparency and slipperiness compared with films which do not satisfy the above-described ranges. The reason is not quite clearly understood, but it is considered that formation of voids around the particles is prevented as far as possible by transversal relaxing in the heat-setting, at the same time $\bar{n}$ and $[\eta]_F$ are controlled and thus fine particles of crystals other than the said minute particles are formed on the surface, which will contribute to slipperiness.

SPECIFIC DESCRIPTION OF THE INVENTION

Now the process of film-making of this invention will be explained specifically. Polyester chips in which minute particles of kaolin, silica, etc. and additives such as stabilizer, pigment, defoaming agent, organic lubricant, polyalkylene glycol, etc. have been incorporated are dried by a conventional method, and extruded with an extruder. The extruded sheet is cooled to solidify on a rotary cooler and thus unstretched polyester sheet is made. In this occasion, it is preferable to employ the conventional electrostatic pinning method. The thus obtained film is stretched in the first axial direction, usually the longitudinal direction so that the birefringence Δn exceeds 0.080. The stretching temperature is preferably not lower than 75° C. and not higher than 130° C. Hard-chromium-plated rolls, ceramic rolls, or elastomer rolls such as teflon-coated rolls can be conveniently used. Most preferably stretching is carried out in one step at a temperature of 80° C. to 90° C. using hard-chromium-plated rolls. The second axial direction stretching is carried out by cooling the primarily stretched film to a temperature below the glass transition point thereof, or without cooling, preheating the film to a temperature of 90° C. to 150° C., and then stretching the film in the second direction at almost the same temperature by a factor of 3.5 to 5.0. Thus a biaxially stretched film is formed. It is not desirable that the stretching factor in the second direction stretching be not more than 3.5, since non-uniformity in thickness in the second direction is amplified. A factor of 3.8 to 5.0 is preferred and a factor of 4.0 to 5.0 is more preferred. The thus obtained biaxially oriented film is heat-set at a temperature of 200° to 250° C. for 1 second to 10 minutes, but it is necessary to heat-relax by 1 to 15% in the transverse direction at a temperature not lower than 200° C. in the heat-setting zone. Most preferably, it is preferred that the film is heat-relaxed in the transverse direction in the highest temperature zone of the heat-setting zone.

Further, it is preferred that for the purpose of improving transparency and slipperiness the film once heat-set at a temperature not lower than 200° C. is cooled to a temperature not higher than 120° C., and again is heat-set at a temperature not lower than 200° C. That is to say, the so-called two-step heat-setting is preferred.

In the conventional stretching, when the birefringence Δn after the longitudinal stretching is not less than 0.080, affinity between the particles and the polyester resin is poor and therefore, voids are formed around the particles. In contrast, in the process of the present invention, voids are not easily formed since the ΔP value is lower, and consequently the internal haze is decreased and thus transparency is improved. On the other hand, fine unevenness was formed by crystallization on the surface of the film in addition to protrusions by particles by defining $[\eta]_F$, $\bar{n}$, ΔP and Δn each in a specific range. Thus excellent slipperiness is attained without increasing the surface haze.

The biaxially oriented heat-set polyester film of this invention has a dynamic friction coefficient between films lower than the static friction coefficient, and the static friction coefficient is not more than 1.1, preferably not more than 0.9. If the static friction coefficient exceeds 1.1, blocking is caused during the manufacturing and the using of the film, making them impossible. In the film of this invention, transparency as a base film is required, and therefore, the total haze value should be not more than 2.0% in a film of 75μ thickness, preferably not more than 1.8%. The internal haze should preferably be not less than 0.6% and not more than 1.2%.

As has been described above, this invention provides a film provided with excellent transparency, slipperiness, flatness, thickness uniformity, and excellent surface properties free from scratches and stains due to sticking. This invention is applicable to films of a thickness of 3μ to 500μ, preferably 20μ to 150μ.

WORKING EXAMPLES

The invention will now be specifically illustrated by way of working examples, which should not be taken as limiting the invention.

The methods of evaluation of films are as follows.

(1) Haze

Surface haze and internal haze were measured using an automatic digital hazemeter (NDH-20D manufactured by Nippon Denshoku Kogyo K.K.) in accordance with JIS-K6714.

The thickness of a film is designated d(μ), the measured haze value of a film is designated $H_1$, the haze measured after liquid paraffin is applied on the film surface is designated $H_0$, then, $\Delta H$ and haze of a film 75μ in thickness $H_1^{75}$ is defined as:

$$\Delta H = H_1 - H_0$$

$$H_1^{75} = H_0 \times \frac{75}{d} + (H_1 - H_0)$$

(2) Average Refractive Index, Birefringence and Degree of Planar Orientation

The measurement of refractive index of films was carried out using an Abbe refractometer (manufactured by Atago K.K.) with a sodium lamp.

The maximum refractive index $n_\gamma$ of the film surface, the refractive index in the direction perpendicular to the former $n_\beta$ and the refractive index in the thickness direction $n_\alpha$ were measured and the average refractive index, birefringence and degree of planar orientation were calculated according to the following equations.

Average refractive index = $(n_\gamma + n_\beta + n_\alpha)/3$
Birefringence = $n_\gamma - n_\beta$
Degree of surface orientation = $(n_\gamma + n_\beta)/2 - n_\alpha$ (3) Birefringence (Longitudinally Stretched Film)

Retardation was measured by a Carl Zeiss polarizing microscope, and birefringence was calculated by the following equation $$\Delta n = R/d$$

wherein R is retardation and d is thickness of film (μm)

(4) Slipperiness

Two sheets of films were placed on a flat glass plate one on top of the other. A rubber sheet was placed over the film and a load was placed on the rubber so that the contact pressure of the films was 2 g/cm². One film was slid relative to the other at a rate of 20 mm/min and the frictional force was measured. The friction coefficient when the films were slid by 5 mm was taken as the dynamic friction coefficient.

(5) Non-uniformity in Thickness

The thickness of a film was measured over 2 m in the longitudinal direction using a continuous film thickness tester (made by Anritsu Denki K.K.), and non-uniformity in thickness was calculated according to the following equation Non-uniformity in thickness =

$$\frac{\text{Maximum Thickness} - \text{Minimum Thickness}}{\text{Average Thickness}} \times 100 \ (\%)$$

(6) Surface Defects Due to Sticking and Scratching

The surface of a film which was covered with aluminum by vacuum deposition was observed under a Carl Zeiss differential interference microscope. Films having defects are indicated by x and film having no defects are indicated by o.

(7) Ratio $X_I$

Film samples were measured by an automatic X-ray diffractometer to obtain the peak value on the (100) face at $2\theta = 26°$ and the peak value on the ($1\bar{1}0$) face at $2\theta = 23°$, and ratio of the two was calculated. The X-ray output was 30 KV and 15 mA.

(8) Intrinsic Viscosity [η]

One (1) g of polymer was dissolved in 100 ml of a mixed solvent of phenol/tetrachloroethane (50:50 by weight) and the viscosity was measured at 30° C.

(9) The Number of Unevenness Units (Roughness Units) which are Protrusions Surrounded by Recesses (A)

The number (A) was measured as follows. The surface of a film which was covered with aluminum by vacuum deposition was photographed using a Carl Zeiss differential interference microscope at a magnification of ×750. The number of protrusions having recesses the longer diameter of which is at least 3 μm in a 1 mm² area was counted.

EXAMPLES 1~2 AND COMPARATIVE EXAMPLES 1~5

(Preparation of Polyester Chips)

One hundred (100) parts of dimethyl terephthalate, 70 parts of ethylene glycol and 0.07 part of calcium acetate monohydrate were placed in a reactor. The mixture was heated for ester interchange, methanol being distilled off. After initiation of the reaction, the temperature reached 230° C. in about 4.5 hours, and the ester interchange reaction was substantially finished.

Then 0.04 part of phosphoric acid and 0.035 part of antimony trioxide were added to the mixture, and polymerization was conducted by a conventional method. That is, the reaction temperature was gradually raised to 280° C., while the pressure was gradually lowered to 0.5 mmHg. After 4 hours, the reaction was finished and the produced polyester (A) was formed into chips by a conventional method.

The procedures of preparing polyester (A) were repeated except that 0.10 part of amorphous silica having an average particle diameter of 1.3μ was added after the ester interchange, and thus polyester (B) containing amorphous silica was obtained.

Also, polyester (C) was obtained by adding 0.05 part of amorphous silica having an average particle diameter of 30 μm in the same manner as the preparation of polyester (B).

(Preparation of Film)

Polyester (A), polyester (B) and polyester (C) were blended in a ratio of 65:10:25, and the mixture was dried in a conventional manner and melt-extruded at 285° C., and cooled to solidify it and thus made into an amorphous sheet.

The amorphous sheet was heated by an IR heater and longitudinally stretched with hard-chromium-finished mirror rolls at 85° C. by a factor of 3.6 and thus a film of which Δn was 0.090 was obtained. The thus obtained film was then transversely stretched at 124° C. by a factor of 4.0 and, thereafter, the film was heat-set at various temperatures, and in the heat-setting, relaxation in the transversal direction was carried out by various factors, and thus biaxially stretched films 75μ in thickness were obtained. Also films of varied viscosities were prepared by varying the viscosity of polyester.

Thus the results (film characteristics) as shown in Table 1 were obtained with respect to Comparative Examples 1 to 5 and Examples 1 and 2.

COMPARATIVE EXAMPLE 6

The same amorphous sheet as used in the above-described Examples and Comparative Examples was longitudinally stretched at 85° C. by a factor of 3.0 to attain a Δn value of 0.060, was then stretched transversely at 120° C. by a factor of 4.0, and heat-set at 242° C. to obtain a biaxially stretched film of a thickness of 75μ.

The characteristics of these films are shown in Table 1.

The haze and friction coefficient were not measured with respect to samples which are extremely poor in flatness such as having transversal streaks.

though the friction coefficient is very good. In Comparative Example 3, relaxation was not carried out. Therefore, the ΔP and Δn values are high and the $X_I$ value is low, and thus the film has good transparency but inferior slipperiness. In Comparative Example 4, the factor of the transverse relaxation in heat-setting is too high, and therefore the ΔP is too low and the $X_I$ value is too high, thus transparency is impaired and the film is inferior in flatness. In Comparative Example 5, the heat-setting temperature is low, therefore the friction coefficient is high and thus winding of the film is difficult. In Comparative Example 6, the Δn value after longitudinal stretching is low, and thus the Δn value after the biaxial stretching and heat- setting is too high and therefore the film is inferior in flatness and unusable.

As has been described, the polyester film of this invention is excellent in transparency and slipperiness and useful for photography and graphic arts, especially photoengraving.

What we claim is:

1. Transparent slippery biaxially stretched polyester film characterized by satisfying the relations represented by the following formulas after being biaxially stretched and heat-set:

$$0.155 \leq \Delta P \leq 0.165 \tag{1}$$

$$1.605 \leq \overline{n} \leq 1.610 \tag{2}$$

$$\Delta n \leq 0.02 \tag{3}$$

TABLE 1

|  | Comp. Ex. 1 | Comp. Ex. 2 | Ex. 1 | Comp. Ex. 3 | Ex. 2 | Comp. Ex. 4 | Comp. Ex. 5 | Comp. Ex. 6 |
|---|---|---|---|---|---|---|---|---|
| Longitudinal Δn | 0.090 | 0.090 | 0.090 | 0.090 | 0.090 | 0.090 | 0.090 | 0.060 |
| Longitudinal stretching |  |  |  |  |  |  |  |  |
| Temp. | 85° C. | 85° C. | 85° C. | 85° C. | 85° C. | 85° C. | 85° C. | 85° C. |
| Factor | ×3.5 | ×3.7 | ×3.6 | ×3.6 | ×3.6 | ×3.6 | ×3.6 | ×3.0 |
| Transverse stretching |  |  |  |  |  |  |  |  |
| Temp. | 120° C. | 120° C. | 120° C. | 120° C. | 120° C. | 120° C. | 120° C. | 120° C. |
| Factor | ×4.0 | ×4.0 | ×4.0 | ×4.0 | ×4.0 | .×4.0 | ×4.0 | ×4.0 |
| Heat-setting |  |  |  |  |  |  |  |  |
| Temp. | 242° C. | 242° C. | 242° C. | 242° C. | 242° C. | 242° C. | 230° C. | 242° C. |
| Factor of transverse relaxation | 7 | 7 | 7 | 0 | 10 | 15 | 7 | 0 |
| Viscosity of film $[\eta]_F$ | 0.680 | 0.500 | 0.625 | 0.625 | 0.625 | 0.625 | 0.625 | 0.625 |
| Number of protrusions with recesses | 0 | 0 | 0 | 0 | 0 | 0 | 0 | 300 |
| Surface property (sticking, scratch, etc.) | o | o | o | o | o | o | o | o |
| Flatness (streaks, etc.) | o | o | o | o | o | x | o | x |
| Friction coefficient |  |  |  |  |  |  |  |  |
| $\mu_s$ | 1.3 | 0.6 | 0.7 | 1.4 | 0.7 |  | 1.3 |  |
| $\mu_d$ | 1.0 | 0.5 | 0.6 | 1.1 | 0.5 |  | 1.2 |  |
| Haze |  |  |  |  |  |  |  |  |
| ΔH | 0.3 | 0.9 | 0.3 | 0.3 | 0.4 |  | 0.3 |  |
| $H_0^{75}$ | 1.2 | 1.2 | 1.2 | 1.2 | 1.2 |  | 1.1 |  |
| $H_1^{75}$ | 1.5 | 2.1 | 1.5 | 1.5 | 1.6 |  | 1.4 |  |
| Physical properties |  |  |  |  |  |  |  |  |
| $\overline{n}$ | 1.6065 | 1.6067 | 1.6069 | 1.6070 | 1.6065 | 1.6065 | 1.6055 | 1.6070 |
| Δn | 0.009 | 0.008 | 0.007 | 0.015 | 0.006 | 0.001 | 0.005 | 0.030 |
| ΔP | 0.163 | 0.163 | 0.163 | 0.167 | 0.158 | 0.153 | 0.167 | 0.160 |
| $X_I$ | 8 | 8 | 8 | 6 | 10 | 13 | 5 | 12 |
| Overall evaluation | x | x | o | x | o | x | x | x |

In Table 1, the film of Comparative Example 1 has too high a viscosity, and therefore, the friction coefficient is high notwithstanding that heat-setting was conducted at the high temperature of 242° C.; as a result, winding of the film is difficult. In contrast, the film of Comparative Example 2 has a low viscosity, but because it was heat-set at a higher temperature, too many unevenness units were formed on the surface due to crystallization. Also, as crystallization proceeded into the interior of the film, transparency is impaired, al- $$7.0 \leq X_I \leq 11.0 \tag{4}$$

$$0.55 \leq [\eta]_F \leq 0.65 \tag{5}$$

$$0.007\sqrt{[\eta]_F - 0.55} + 0.003 \geq \bar{n} - 1.604 \geq 0.007\sqrt{[\eta]_F - 0.55} \quad (6)$$

$$\Delta H \leq 0.5 \quad (7)$$

wherein $\Delta P$, $\bar{n}$, $\Delta n$, $X_I$, $[\eta]_F$ and $\Delta H$ are respectively degree of planar orientation, average refractive index, birefringence, % ratio of the peak value of the $(1\bar{1}0)$ face measured by X-ray diffractometry to the peak value of the (100) face, intrinsic viscosity and surface haze of the biaxially stretched film.

2. The polyester film as recited in claim 1, which is characterized by containing not less than 0.003% by weight and not more than 0.015% by weight of amorphous silica having an average particle diameter of $0.8\mu$ to $1.5\mu$.

3. A process for transparent slippery polyester film which satisfies the relations represented by the following formulas:

$$0.155 \leq \Delta P \leq 0.165 \quad (1)$$

$$1.605 \leq \bar{n} \leq 1.610 \quad (2)$$

$$\Delta n \leq 0.02 \quad (3)$$

$$7.0 \leq X_I \leq 11.0 \quad (4)$$

$$0.55 \leq [\eta]_F \leq 0.65 \quad (5)$$

$$0.007\sqrt{[\eta]_F - 0.55} + 0.003 \geq \bar{n} - 1.604 \geq 0.007\sqrt{[\eta]_F - 0.55} \quad (6)$$

$$\Delta H \leq 0.5 \quad (7)$$

wherein $\Delta P$, $\bar{n}$, $\Delta n$, $X_I$, $[\eta]_F$ and $\Delta H$ are respectively degree of surface orientation, average refractive index, birefringence, % ratio of the peak value of the $(1\bar{1}0)$ face measured by X-ray diffractometry to the peak value of the (100) face, intrinsic viscosity and surface haze of the biaxially stretched film, said process comprising longitudinally stretching an unstretched polyester film containing minute particles of amorphous silica and other substances at a temperature of 75° C. to 130° C. in one step so that the birefringence after the longitudinal stretching exceeds 0.080, and transversally stretching the film by a factor of not less than 3.5 and not more than 5.0, and thereafter heat-setting the film at a temperature of 200° C. to 250° C. for 1 second to 10 minutes, wherein the film is transversally relaxed by 1 to 15% at a temperature not lower than 200° C.

* * * * *